A. YOUNG.
Verniers.
No. 166,912. Patented Aug. 17, 1875.
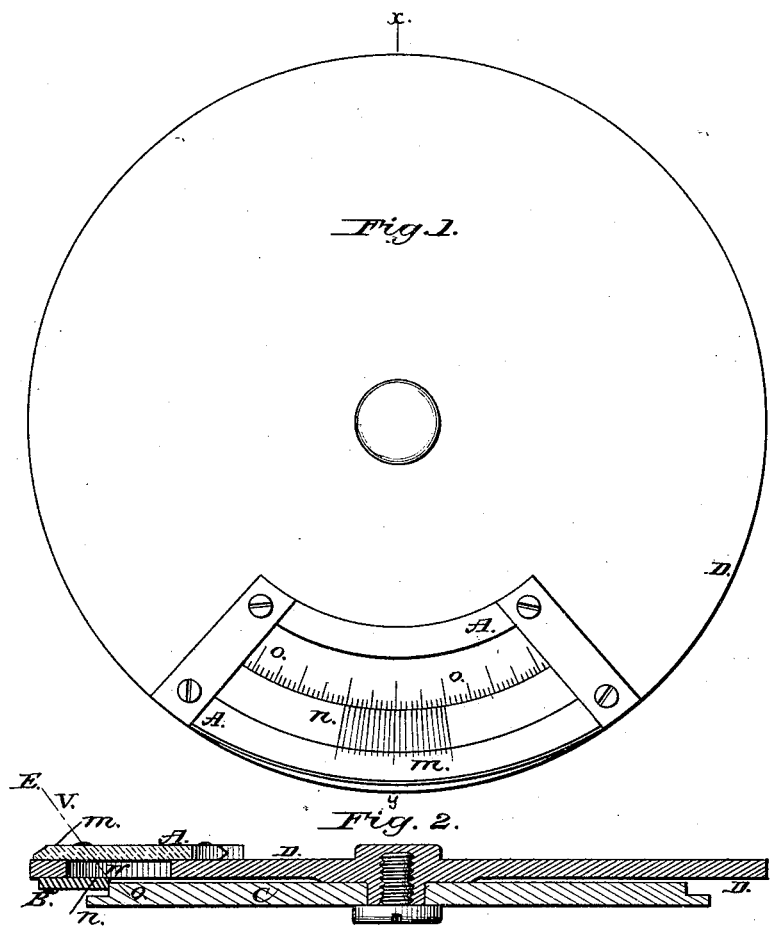
Witnesses:
S. N. Watson
Edward Richardson
Inventor:
Alfred Young

UNITED STATES PATENT OFFICE.

ALFRED YOUNG, OF PHILADELPHIA, PENNSYLVANIA.

IMPROVEMENT IN VERNIERS.

Specification forming part of Letters Patent No. 166,912, dated August 17, 1875; application filed June 16, 1875.

*To all whom it may concern:*

Be it known that I, ALFRED YOUNG, of the city of Philadelphia, in the State of Pennsylvania, have invented a new and useful Improvement for Verniers and Graduated Arcs, whereby the parallax in reading the same may be avoided, of which the following is a specification:

The invention consists in graduating the glass cover that is usually placed over the verniers, or in placing one so graduated, when there is no cover, in graduations corresponding to those on the vernier, in such manner that these graduations on glass form a guide to keep the eye or line of sight in a true line passing to center of graduations, whereby the projection of the line does not produce an error in the readings. As the vernier and the graduated plates are separate pieces, it is necessary for correct reading that there should be perfect contact between plates, and that they should be on same plane, or that there should be some guide to project lines rightly. The other requirements of an instrument render the first of these conditions impossible, while the second is difficult, and even if accomplished leaves a space which breaks the continuity of the lines on vernier and graduated plates, thereby decreasing the accuracy of the reading.

By my invention the vernier may be raised, as indicated in the drawings, above the graduated plate, and the graduations on the glass will so direct the eye that the lines on the two appear continuous without there being actual contact. Without the invention the eye, with no guide, may be so situated to side of correct line that the continuation of the graduation will produce error.

In the accompanying drawings, A represents the graduated glass vernier-cover, upon which the graduations $m\ m$ are placed. B represents the vernier with the usual vernier graduations $n\ n$. C represents the graduated plate, upon which are graduations $o\ o$. D represents the plate carrying the vernier and vernier-cover. E represents the position of eye of observer, as generally placed in reading. $v\ w$ indicate the general range of line in which verniers are read, and is situated in same vertical plane as $x\ y$. $x\ y$ indicate the line passing through those graduations of vernier and plate which agree.

Figure 1 is a top view. Fig. 2 is a section along line $x\ y$.

The graduations $m\ m$ on glass vernier-cover are same as those on vernier $n\ n$, and the corresponding graduations are placed vertically over each other, and in plane passing through center of graduations, so that when the eye, in line $v\ w$ or other line, is brought in such position that the graduation $m\ m$ on glass agrees with the corresponding graduation on vernier $n\ n$, as seen through the glass, the projection of $n\ n$ is free of parallax, and forms an apparent continuous line, with its agreeing line $o\ o$ on graduated plate.

I claim—

The vernier-cover A, provided with the graduations $m\ m$, in combination with the graduated plate C and plate D, carrying the vernier and vernier-cover, substantially as and for the purpose set forth.

ALFRED YOUNG.

Witnesses:
T. N. WATSON,
EDWARD RICHARDSON.